United States Patent [19]
Brock et al.

[11] Patent Number: 5,781,327
[45] Date of Patent: Jul. 14, 1998

[54] OPTICALLY EFFICIENT HIGH DYNAMIC RANGE ELECTRO-OPTIC MODULATOR

[75] Inventors: John C. Brock, Redondo Beach; Michael G. Wickham, Rancho Palos Verdes, both of Calif.

[73] Assignee: TRW Inc., Redondo Beach, Calif.

[21] Appl. No.: 699,427

[22] Filed: Aug. 19, 1996

[51] Int. Cl.[6] .................... G02F 1/03; G02F 1/01; H04B 10/02; H04B 1/06
[52] U.S. Cl. ................ 359/249; 359/245; 359/260; 359/276; 359/286; 359/174; 359/187; 372/94; 385/1; 385/2; 455/202
[58] Field of Search ........................ 359/180, 187, 359/174, 245, 249, 260, 276, 286; 372/94; 385/1, 2; 455/202

[56] References Cited

U.S. PATENT DOCUMENTS

| | | | |
|---|---|---|---|
| 3,500,250 | 3/1970 | Frerking | 324/118 |
| 4,207,525 | 6/1980 | Martel et al. | 455/109 |
| 4,820,009 | 4/1989 | Thaniyavarn | 385/2 |
| 5,016,990 | 5/1991 | Dobson | 359/260 |
| 5,077,542 | 12/1991 | Lanoiselee | 332/151 |
| 5,109,441 | 4/1992 | Glaab | 385/1 |
| 5,161,044 | 11/1992 | Nazarathy et al. | 359/157 |
| 5,168,534 | 12/1992 | McBrien et al. | 385/3 |
| 5,181,210 | 1/1993 | Chung et al. | 372/6 |
| 5,253,309 | 10/1993 | Nazarathy et al. | 385/4 |
| 5,278,923 | 1/1994 | Nazarathy et al. | 385/3 |
| 5,282,072 | 1/1994 | Nazarathy et al. | 359/157 |
| 5,321,543 | 6/1994 | Huber | 359/187 |
| 5,373,389 | 12/1994 | Huber | 359/195 |
| 5,387,992 | 2/1995 | Miyazaki et al. | 359/124 |
| 5,400,417 | 3/1995 | Allie et al. | 385/2 |
| 5,420,868 | 5/1995 | Chraplyvy et al. | 370/122 |
| 5,424,863 | 6/1995 | Gertel | 359/173 |
| 5,430,569 | 7/1995 | Blauvelt et al. | 359/162 |
| 5,453,608 | 9/1995 | Conder et al. | 250/205 |
| 5,561,546 | 10/1996 | Esman | 359/245 |

*Primary Examiner*—Georgia Y. Epps
*Assistant Examiner*—Evelyn A. Lester
*Attorney, Agent, or Firm*—Michael S. Yatsko

[57] ABSTRACT

An electro-optic modulator and a method for its use, in which an optical carrier is effectively suppressed for transmission of a radio-frequency (rf) modulating signal over an optical communication link, to provide improved demodulator performance. A carrier component is recovered from the modulator, amplified, and reused, to minimize the effect of optical carrier losses. In one embodiment of the invention, a modulator (10) with complementary output ports (20 and 22) generates a carrier-suppressed output (FIG. 2B) containing rf sidebands from one port (20) and a strong carrier component (FIG. 2C) from the other output port (22). The carrier component is filtered in a residual sideband filter (14), amplified in an optical amplifying medium (12) and returned to the modulator (10) as its carrier input. In a second embodiment of the invention, a modulator (30) with a single output port produces rf sidebands and a suppressed carrier component (FIG. 4A), all of which are amplified in an optical amplifying medium (32) and coupled to an optical circulator (34), which, in cooperation with a narrowband filter (36), separates the rf sidebands from the amplified carrier component, the latter being returned to the modulator (30) as the carrier input. In both embodiments, a suppressed-carrier optical signal is obtained for transmission over a communication link, but carrier losses are minimized by recovery and recirculation of the carrier. In an alternate embodiment of the invention (FIG. 5), a second modulator (40) removes any residual rf components and avoids any unwanted cavity resonance.

10 Claims, 3 Drawing Sheets

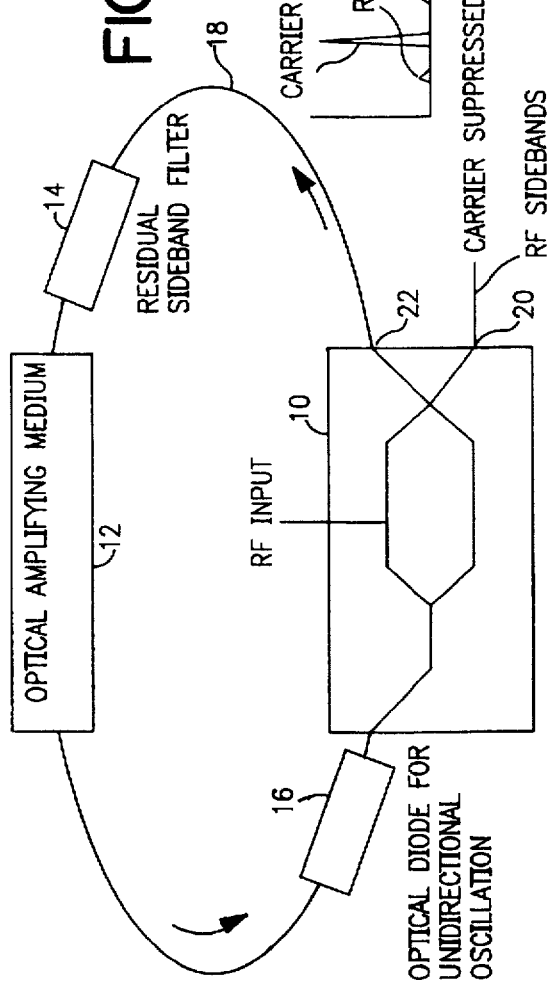

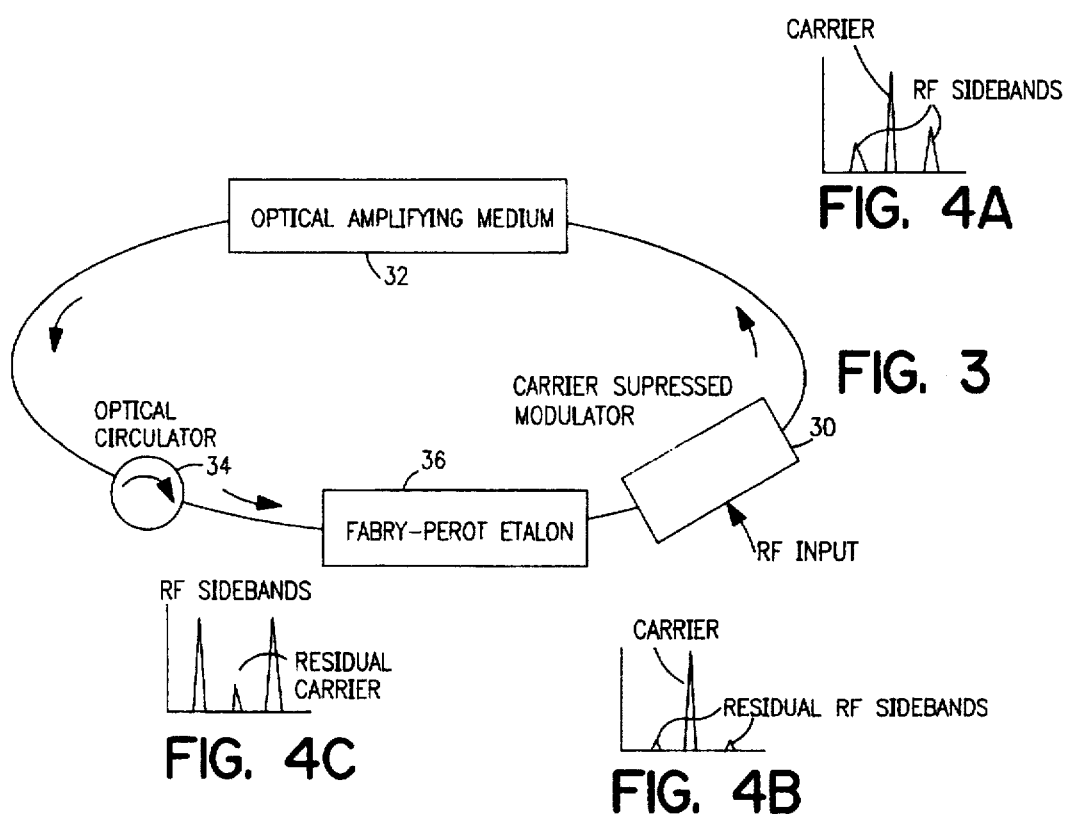

OPTICALLY EFFICIENT HIGH DYNAMIC RANGE ELECTRO-OPTIC MODULATOR

BACKGROUND OF THE INVENTION

This invention relates generally to electro-optic modulators and, more particularly, to electro-optic modulators used in the transmission of radio-frequency (rf) signals on optical carriers. One important application for analog transmission of rf signals on optical carriers is in modern CATV (community antenna television, or cable television) systems, which require modulators with high linearity and low equivalent input noise.

Optical transmission of radio-frequency (rf) signals requires two major transducer components: an optical modulator to convert electrical rf signals to corresponding fluctuations in light intensity, and a demodulator, such as a photodiode, to convert the modulated optical carrier back into electrical rf signals. The invention is primarily concerned with the modulation process, in which an electrical rf signal modulates the intensity of a light beam. In this description it will be understood that, although "light beam," "optical carrier" and similar terms are used to refer to radiation in the visible portion of the electromagnetic frequency spectrum, the principles of the invention also apply to radiation at frequencies outside the visible range, such as in the infrared or ultraviolet portions of the spectrum.

The invention is specifically concerned with optical modulation of the analog type. The modulating rf signal is continuously varying in amplitude and these variations must be faithfully reproduced as corresponding variations in the intensity of the optical carrier. This is to be contrasted with digital optical modulation, wherein the modulating signals have only a small number of possible amplitude levels (usually two). Of course, the rf signal that is used in analog modulation of an optical carrier may itself be digitally modulated, but the electro-optical modulation process is still an analog one.

There are two major requirements for analog optical intensity modulation. One is that the intensity variations in the optical signal must be a faithful reproduction of the original rf signal. In other words, the modulator must provide a linear relationship between its input and output signals. Changes in the electrical input signal are reflected in proportional changes in the optical output intensity. The other requirement is that the variations in optical intensity should be as strong as possible. If conversion of the rf signal to and from the optical form results in loss of rf signal amplitude, the electro-optical conversion components are said to result in rf insertion loss. Conventional electro-optic modulators, such as the Mach-Zehnder modulator, have a less than desirable performance in terms of both linearity and rf insertion loss. There is extensive technical literature covering analog direct modulation using diode lasers, and analog external modulators based on interferometric approaches.

Recent research in this field has shown that modulators that suppress the optical carrier relative to modulated sidebands can provide better analog performance. In effect, carrier suppression provides for increased modulation depth, which results in improved performance upon demodulation of the optical signal. Various approaches have been proposed for suppressing the carrier. One approach is to mix an unmodulated carrier that has been phase shifted by 180° back into the modulated signal. In theory, the two out-of-phase carrier components cancel each other and the carrier optical power radiates into a substrate on which the mixer is fabricated, if a single-output mixer is used. In a dual-output mixer, the carrier optical power is lost through the unused output port of the mixer.

Another approach to carrier suppression is to bias the modulator appropriately. A Mach-Zehnder modulator has a transfer function that approximates a sine-squared function, i.e., the optical throughput of the modulator is approximately proportional to $\sin^2 v$, where v is electrical modulating voltage. With an appropriately selected dc (direct current) bias point, referred to as the low bias point, the carrier is effectively suppressed in the optical output from the modulator. Again, this well known approach for carrier suppression results in large optical power losses. As much as 99% of the optical power that is input to the modulator may be lost by carrier suppression using these conventional carrier suppression techniques.

It will be appreciated from the foregoing that there is a need for an electro-optic modulation technique that preserves the advantages of carrier suppression but does not result in large losses of optical power. The present invention is directed to this end.

SUMMARY OF THE INVENTION

The present invention resides in an electro-optic modulator that is optically efficient and provides a high dynamic range in comparison to electro-optic modulators of the prior art. Briefly, and in general terms, the modulator of the invention comprises: (a) an optical carrier suppressing modulator having an electrical input port for input of a radio-frequency (rf) signal, an optical input port for input of an optical carrier signal, and an optical output port for output of a modulated signal in which the carrier is substantially suppressed; (b) optionally a narrowband optical filter for passing substantially no signals other than the optical carrier; (c) an optical device for outcoupling optical signals containing rf signal information; and (d) an optical amplifying medium. The optical carrier suppressing modulator, the narrowband optical filter, the optical outcoupling device and the optical amplifying medium are optically connected in a ring configuration, and the carrier is recovered from the modulator, amplified, and reintroduced to the modulator, to enhance the optical efficiency of the overall device.

In one embodiment of the invention, the optical outcoupling device is integral with the modulator, which has two, complementary, output ports. One port outputs a carrier-suppressed output comprising predominantly rf sidebands, and the other port outputs a sideband-suppressed output with a strong carrier component. The carrier component is filtered to remove any residual rf sidebands, if necessary, and is then amplified and returned to the modulator as its optical carrier input. In a second embodiment of the invention, the modulator has a single output port, through which is output a composite signal in which the carrier is only partially suppressed and the rf sidebands are substantial. The composite signal is amplified and introduced to an optical circulator, which, in cooperation with a narrowband filter connected to a second port of the circulator, performs the outcoupling function. The narrowband filter passes only the amplified carrier component, which is returned to the modulator as its carrier input. The circulator has a third port from which is output the amplified rf sidebands, with only a residual carrier component. Both embodiments generate a desired optical signal containing only the rf sidebands and a suppressed carrier, but carrier losses are minimized by recovering the carrier from the modulator and recirculating it after amplification.

In accordance with another embodiment of the invention, a second electro-optic modulator effectively avoids any potential cavity resonance condition by effectively providing additional suppression of any rf residual sidebands from the output of the first modulator. The second modulator uses a modulating signal that is a time-delayed phase-inverted form of the rf modulating signal used in the first modulator. The second modulator has a first optical output that contains only rf sideband components, and is discarded, and a second optical output containing essentially only the optical carrier component.

It will be appreciated from the foregoing that the present invention represents a significant advance in the field of analog electro-optic modulators. In particular, the invention provides a suppressed-carrier modulated optical signal without the optical losses usually associated with suppressed-carrier modulators and without the substantial reduction in dc power efficiency. Other aspects and advantages of the invention will become apparent from the following more detailed description, taken in communication with the accompanying drawings.

BRIEF DESCRIPTION OF THE DRAWINGS

FIG. 1 is a schematic diagram of one preferred embodiment of an electro-optic modulator in accordance with the invention;

FIGS. 2A, 2B and 2C are frequency spectra graphs depicting the frequency content of signals at various points in the modulator of FIG. 1;

FIG. 3 is a schematic diagram of an alternate embodiment of an electro-optic modulator in accordance with the invention;

FIGS. 4A, 4B and 4C are frequency spectra graphs depicting the frequency content of signals at various points in the modulator of FIG. 3.

DESCRIPTION OF THE PREFERRED EMBODIMENTS

Figure 5:
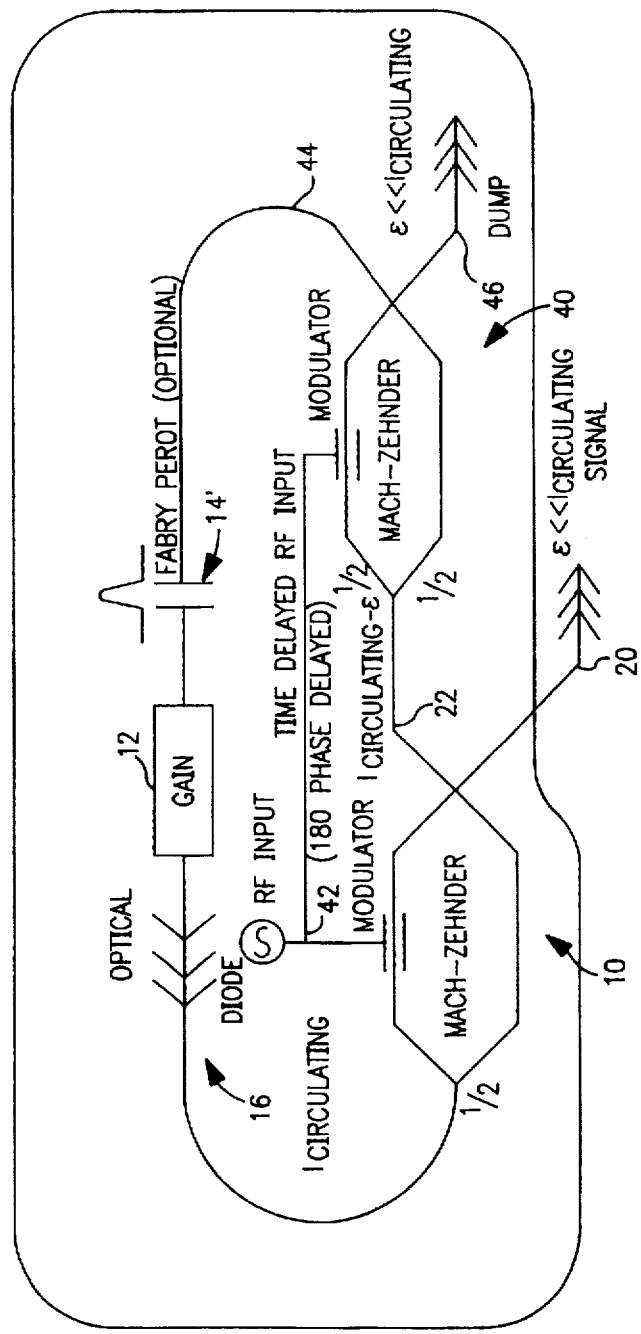
FIG. 5 is a schematic diagram of another alternate embodiment of the invention.

As shown in the drawings for purposes of illustration, the present invention pertains to analog electro-optic modulation, wherein an optical carrier is modulated in intensity by a radio-frequency (rf) signal, which may itself be modulated with an information signal, such as a conventional television information signal. The modulated optical signal can be readily transmitted over optical fibers, and later subjected to optical demodulation using an optical detector. It is now well known that optical communication systems of this general type provide better analog performance when the carrier is suppressed. Suppression of the carrier by conventional methods, such as carrier cancellation or the use of a low bias point in the modulator, result in large optical power losses and, therefore, relatively poor performance in electrical power efficiency.

In accordance with the present invention, loss of optical power from carrier suppression is dramatically reduced by recovering and recirculating the optical carrier. FIG. 1 shows, for example, a modulator system including a two-port low-biased modulator 10, an optical amplifying medium 12, a residual sideband filter 14 and an optical diode 16 for unidirectional oscillation. The components are optically connected in a ring configuration by optical fiber 18. The two-port modulator 10 is of conventional design and may be, for example, Model 4531 or 4532 manufactured by United Technologies Photonics. These are dual-output Mach-Zehnder amplitude modulators, producing complementary outputs at the two optical output ports. Thus, as shown in FIGS. 2A–2C, if an optical carrier and a modulating radio-frequency (rf) signal are input to the modulator 10, the normal modulation process would produce an output spectrum having a carrier and two rf sidebands, as shown in FIG. 2A. However, the complementary outputs, shown at 20 and 22, are a carrier-suppressed output at one of the output ports (20), as shown in FIG. 2B, and a carrier signal with only residual rf sidebands at the other (22) output port, as shown in FIG. 2C.

The suppressed-sideband signal from output port 22 is coupled to the residual sideband filter 14, which is a narrowband filter that removes the residual sidebands, if necessary, and couples the remaining carrier component to the optical amplifying medium 12. The latter component amplifies the carrier, which is coupled back into the carrier input of the modulator 10, by way of the optical diode 16, which ensures that there is no coupling of carrier energy in the reverse direction from the modulator 10 to the amplifying medium 12. Because the dual-port modulator 10 suppresses the carrier, but recovers it for amplification and reuse, the overall arrangement is optically more efficient and provides a higher dynamic range than electro-optic modulators available prior to the present invention.

FIG. 3 depicts an alternate embodiment of the invention useful for multi-octave applications, including a modulator 30, an optical amplifying medium 32, an optical circulator 34 and a Fabry-Perot etalon 36. The modulator 30 may be, for example, a conventional Mach-Zehnder modulator with a single output port. The modulator 30 is biased to suppress, but not to an extent that would burden the cavity with excessive loss, the carrier component in the modulated output, which is shown in FIG. 4A. The remaining carrier component and the two rf sidebands are amplified in the optical amplifying medium 32, the output of which is coupled to the optical circulator 34. The circulator 34 has three ports, a first of which is coupled to receive input signals from the amplifying medium 32, a second of which is coupled to the Fabry-Perot etalon, and a third provides output of the desired rf sidebands. The circulator 34 and the Fabry-Perot etalon 36 function together to separate the rf sidebands from the carrier. The etalon 36 functions as a narrow-band filter that passes or transmits the carrier, as indicated in FIG. 4B, but for the most part rejects the rf sidebands. Consequently, the circulator 34 outputs through its third port a signal that has most of the carrier signal suppressed and contains predominantly only the rf sidebands, as indicated in FIG. 4C.

FIG. 5 depicts an alternate embodiment of the invention that addresses a potential difficulty with the embodiment of FIGS. 1 and 2. The potential difficulty is that the FIG. 1 cavity has unwanted resonances associated with time of propagation of a signal completely around the ring laser formed by the configuration. Although only a small component of the rf modulated signal may be circulated around the laser, this recirculated component may potentially combine with a newly modulated component and set up an unwanted ringing or resonance effect. The ringing signal can also take the form of a relaxation oscillation. For ionic solid state amplifiers such as $Nd^{+3}$ or $Er^{+3}$, the natural relaxation-oscillation frequency can be very small, less than a megahertz. However, for semiconductor lasers the natural relaxation-oscillation frequency can be much higher, e.g., approximately 2 GHz for a gallium arsenide (GaAs) amplifying medium. One can operate the laser well above the natural relaxation-oscillation frequency to avoid feedback to the laser, but there is still the difficulty of possible resonance due to cavity mode frequencies that are multiples of the reciprocal of the round trip propagation time in the laser cavity. If a perturbation of the laser cavity occurs at a frequency of $1/J_{rt}$, where $J_{rt}$ is the round trip propagation time of the cavity, mode locking or resonant modulation can occur. Although, ideally, the use of a Fabry-Perot etalon in residual sideband filter 14 should assure that mode locking does not occur, there is still a potential for unwanted resonance.

The FIG. 5 embodiment has a similar configuration to the one shown in FIG. 1, including a Mach-Zehnder modulator 10, an optical amplifying medium 12, indicated in the block containing the word "gain," a residual sideband filter 14' in the form of a Fabry-Perot etalon, and an optical diode 16. Also included is a second Mach-Zehnder modulator 40 connected to receive the circulating carrier signal output from port 22 of the first modulator 10. The second modulator 40 is rf-modulated by a signal derived from the same source as the modulating signal for the first modulator 10. As indicated by line 42, the rf modulating signal is inverted by 180° in phase (and appropriately time delay) with respect to the modulating signal applied to the first modulator 10. The time-delayed and phase-inverted modulating signal applied to the second modulator 40 effectively removes any residual rf sideband components, so that a practically pure carrier signal is output on line 44 from the second modulator. The small optical output from the other output port 46 of the second modulator 40 is discarded.

The second modulator 40 in the FIG. 5 embodiment should be completely effective in removing residual rf components from the recirculated carrier signal and thereby avoiding unwanted resonances. The Fabry-Perot etalon 14' also removes residual rf sideband components, and may not always be necessary in this configuration.

It will be appreciated from the foregoing that the present invention represents a significant advance in the field of electro-optic modulators. In particular, the invention provides an electro-optic modulator that is optically more efficient and has a high dynamic range compared with modulators of the prior art. The invention effectively integrates the modulator into a laser of ring configuration, and thereby reduces laser size, weight and power requirements. Moreover, operation as a ring laser suppresses relative intensity noise degradation due to external feedback. The components of the invention may be integrated into a monolithic package to provide an extremely compact, reliable and efficient electro-optic modulator. It will also be appreciated that, although three illustrative embodiments of the invention have been described in detail, various modifications may be made without departing from the spirit and scope of the invention. Accordingly, the present invention should not be limited except as by the appended claims.

What is claimed is:

1. An electro-optic modulator system providing high optical efficiency and high dynamic range, comprising:

a first electro-optic modulator having an electrical input port for input of a radio-frequency (rf) input signal, an optical input port for input of an optical carrier signal, a first optical output port for output of a modulated signal in which the carrier is suppressed, and a second optical output port for output of a recirculated carrier signal a second electro-optic modulator functionally identical to the first, having an electrical input port for input of a time-delayed and phase-inverted form of the same rf signal that is input to the first modulator, and also having an optical input port connected to the second optical output port of the first modulator, a first optical output port for output of any residual rf signal components, and a second optical output port for output of a recirculated carrier signal that has had any residual rf components removed; and an optical amplifying medium for amplifying the recirculated carrier signal;

wherein the carrier is recovered from the first and second modulators, amplified, and reintroduced to the first modulator, but without introducing any unwanted resonances.

2. A modulator system as defined in claim 1, and further comprising:

a narrowband optical filter for passing the optical carrier.

3. A modulator system as defined in claim 1, and further comprising:

a unidirectional optical device coupled between the optical amplifying medium and the first modulator, to ensure that energy is not coupled in a reverse direction back to the optical amplifying medium.

4. A method for modulating an optical carrier with a radio-frequency (rf) signal to provide high optical efficiency and high dynamic range, the method comprising the steps of:

inputting an optical carrier and an rf modulating signal into a first electro-optic modulator;

generating in the first electro-optic modulator a first output that has an rf signal component and a suppressed carrier component, and a second output that has a carrier component and a suppressed rf signal component;

inputting the second output from the first modulator into a second electro-optic modulator;

time-delaying and phase-inverting the rf modulating signal, and inputting the time-delayed and phase-inverted form of the rf modulating signal into the second modulator;

generating in the second electro-optic modulator a first output signal that has an rf signal component that may be discarded, and a second output signal that contains the carrier;

amplifying the carrier obtained from the preceding generating step; and recirculating the amplified carrier to the optical input of the first modulator.

5. A method as defined in claim 4, and further comprising:

optically filtering the output of the second modulator in a narrow-band optical filter, to ensure that only the carrier frequency is passed.

6. A method as defined in claim 4, and further comprising:

passing the amplified carrier through a unidirectional optical device before recirculating it to the first modulator.

7. An electro-optic modulator providing high optical efficiency and high dynamic range, comprising:

an optical carrier suppressing modulator having an electrical input port for input of a radio-frequency (rf) signal, an optical input port for input of an optical carrier signal, and an optical output port for output of a modulated signal in which the carrier is suppressed;

an optical device for outcoupling optical signals containing rf signal information, wherein the optical device is integrated into the optical carrier suppressing modulator, which has a first output port for outputting a carrier-suppressed output and a second output port for outputting a sideband-suppressed output;

an optical amplifying medium, providing an amplified carrier for coupling to the optical input of the modulator; and a narrowband filter coupled to the second output port of the modulator, to filter out residual sideband signals and to couple a recovered carrier to the optical amplifying medium;

wherein the optical carrier suppressing modulator, the optical outcoupling device and the optical amplifying medium are optically connected in a ring configuration;

and wherein sideband components are outcoupled from the modulator with only a residual carrier component, and the carrier is recovered from the modulator, for amplification and reintroduction into the modulator.

8. An electro-optic modulator as defined in claim 7, and further comprising:

a unidirectional optical device coupled between the optical amplifying medium and the optical carrier suppressing modulator, to ensure that energy is not coupled in a reverse direction back to the optical amplifying medium.

9. A method for modulating an optical carrier with a radio-frequency (rf) modulating signal to provide high optical efficiency and high dynamic range, the method comprising the steps of:

inputting an optical carrier and an rf modulating signal into an electro-optic modulator;

generating from the electro-optic modulator an output that has rf sideband components and a residual carrier component;

outcoupling optical signals containing only rf signal information;

amplifying optical signals, including a carrier component, in an optical amplifying medium; and connecting the optical carrier suppressing modulator, the optical outcoupling device and the optical amplifying medium in a ring configuration;

and wherein:

the outcoupling step is performed by the optical carrier suppressing modulator, which has a first output port for outputting a carrier-suppressed output and a second output port for outputting a sideband-suppressed output, an optical filtering step is performed on signals from the second output port, to filter out residual sideband signals and to couple a recovered carrier to the optical amplifying medium;

whereby the carrier is recovered from the modulator, amplified, and reintroduced to the modulator.

10. A method as defined in claim 9, and further comprising:

interposing a unidirectional optical device between the optical amplifying medium and the optical carrier suppressing modulator, to ensure that energy is not coupled in a reverse direction back to the optical amplifying medium.

* * * * *